Sept. 29, 1931.  S. P. VAUGHN  1,825,376
WIPER BLADE FOR CLEANING DEVICES
Filed Dec. 13, 1929
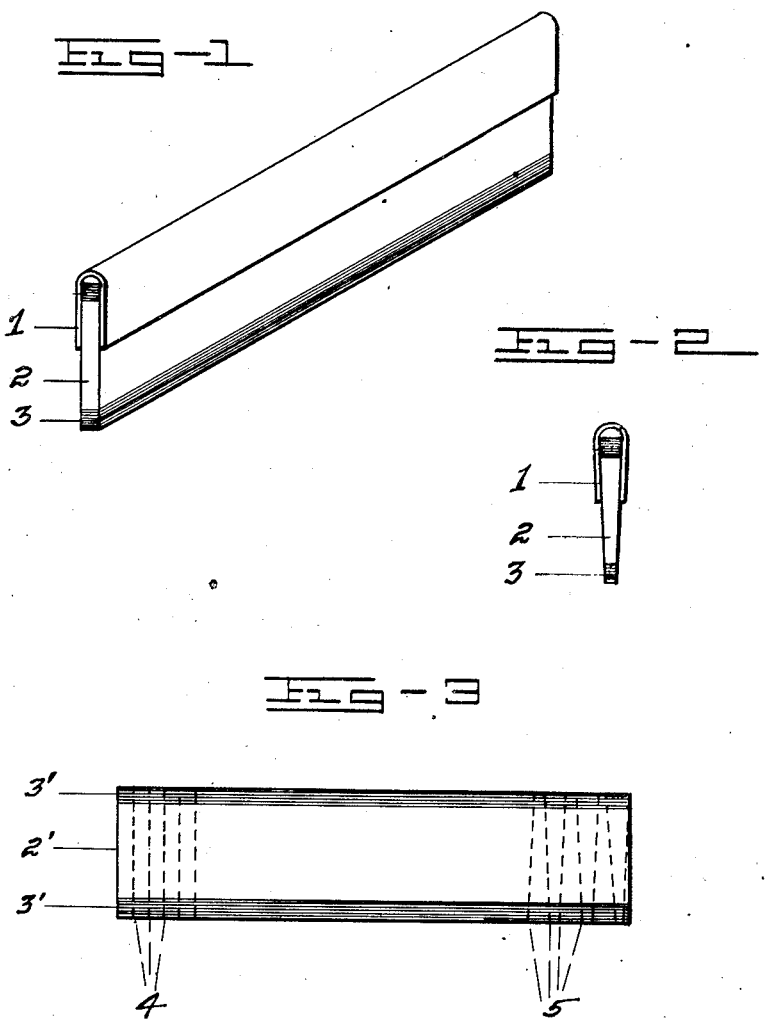
*Sidney P. Vaughn* INVENTOR.

Patented Sept. 29, 1931

1,825,376

UNITED STATES PATENT OFFICE

SIDNEY P. VAUGHN, OF THE UNITED STATES NAVY, ACKERMAN, MISSISSIPPI

WIPER BLADE FOR CLEANING DEVICES

Application filed December 13, 1929. Serial No. 413,880.

(GRANTED UNDER THE ACT OF MARCH 3, 1883, AS AMENDED APRIL 30, 1928; 370 O. G. 757)

The following is a full, clear, and exact description of my invention, and the invention may be manufactured and used by or for the Government for governmental purposes without the payment to me of any royalty thereon.

This invention relates to rubber wiper blades used in cleaning devices for cleaning or wiping smooth surfaces such as glass, and particularly to wiper blades used for cleaning windshields on automobiles and other types of vehicles where a clear vision is required.

Heretofore the rubber strip used in single ply wiper blades for cleaning automobile windshields has been made out of a cheap grade of rubber having poor elastic properties in order to obtain a rubber with a low coefficient of friction so that the blade would slide smoothly over the glass without noise or chatter. As a result such blades have to be discarded in a very short time due to the fact that the rubber quickly breaks at the greatest point of flexure, thus necessitating the renewal of the blade.

It is well known that the better grades of rubber having good elastic properties also have a high coefficient of friction, which makes it unsuitable for use in windshield wiper blades due to its tendency to stick to the glass and chatter, leaving streaks which obstruct the vision. It does not slide smoothly over the glass and makes a squeaky noise which is objectionable. While a cheap grade of soft rubber having poor elastic properties and a low coefficient of friction cleans the glass in a satisfactory manner without chattering or making a noise, the lasting qualities of the rubber are not satisfactory due to the fact that it breaks very quickly at the point of greatest flexure.

It is the principal object of this invention to provide a single ply wiper blade for cleaning windshields and the like, which is cheap, economical and satisfactory in every respect.

A further object is to provide a wiper blade in which that portion that is subjected to continued flexing stresses, when in operation, has good elastic properties, and in which the wiping edge has a low coefficient of friction, so that it will slide smoothly over the surface to be cleaned.

A pure grade of soft rubber generally has good elastic and flexing properties, but it also has a high coefficient of friction which can be reduced only by adding a large percentage of filler, such as oxide of zinc, lamp black, graphite, soap stone, or other fillers which have a comparatively low coefficient of friction. The elastic properties of soft rubber decrease in value as the filler is increased, but the coefficient of friction is decreased. Experiments indicate that soft rubber having not more than 60 per cent mineral filler has very good elastic properties and is suitable for that part of the blade which is subjected to flexing stresses when in operation, but the coefficient of friction is too great to be used as a wiping element for cleaning a smooth glass surface, such as a windshield, in a satisfactory manner. Experiments indicate also that soft rubber having more than 85 per cent of mineral filler has a comparatively low coefficient of friction and is suitable for use in the wiping edge of the blade, but is not suitable for that portion of the blade which is subjected to continued flexing stresses when in operation. Attempts have been made to compromise in the amount of filler used in order to obtain a rubber entirely suitable for both purposes but the results have not been satisfactory.

The above indicates that for best results, the wiping edge of the blade should be made out of rubber having a high percentage of filler and a low coefficient of friction, and that that portion of the blade which is subjected to continued flexing stresses during operation should be made out of rubber having a low percentage of filler and good elastic and flexing properties. This idea is carried out in this invention.

Another object is to provide a single ply wiping blade wherein the wiping edge of the blade is made of rubber or other substance having a color different from the body portion of the blade so that the artistic value of the blade will be increased from a sales point of view.

With these and other objects in view, as will become apparent as the description proceeds, the invention consists in certain novel features of construction as hereinafter described and illustrated in the accompanying drawings in which:

Fig. 1 is a perspective view of a wiper blade embodying my invention. Fig. 2 is an end view of a tapered blade. Fig. 3 illustrates a method of manufacturing the flexible strips used in the blade.

Like numerals refer to like parts through out the several views.

Referring to the drawings, Fig. 1, the wiper blade consists of a substantially U shaped metal channel or back 1 having a composite rubber strip secured therein for engagement with the surface to be wiped or cleaned. That part 2 of the rubber strip adjacent the metal holder 1 is subjected to flexing stresses in cleaning operations and to prevent cracking or breaking at the point of greatest flexure before a reasonable time has elapsed, it is made out of rubber containing a low percentage of filler and having good elastic and flexing properties. That part of the rubber strip acting as the wiping edge 3 of the blade must slide freely over a dry glass surface without chattering or making a noise and at the same time clean the surface thoroughly, and is made out of soft rubber containing a high percentage of filler and having a low coefficient of friction when compared with the rubber used to form that part of the blade subjected to flexing stresses during operation.

Instead of using rubber having a low coefficient of friction for the wiping edge of the blade, other flexible material having a comparatively low coefficient of friction may be used with good results.

Fig. 3 illustrates a method of manufacturing the rubber strips used in the blades. A thin sheet 3' of soft rubber containing a large percentage of filler and having a low coefficient of friction, or other flexible material suitable for the purpose, is securely vulcanized to each side of a block 2' of soft rubber containing a small percentage of filler and having good elastic and flexing properties. To form strips having parallel sides for use in parallel sided backs the block is sliced as indicated by the dotted lines 4. To form strips having tapered sides for use in backs having sides inclined to one another the block is sliced as indicated by the dotted lines 5.

It will be understood that minor changes in construction, combination and arrangement of the parts and material may be made without departing from the spirit and scope of the invention as claimed.

What I claim is:

1. A cleaning device comprising a stiff back, an elastic rubber element secured thereto capable of being flexed, a soft flexible element secured to said elastic rubber element to serve as a cleaning edge, said flexible element having a lower coefficient of friction than said elastic rubber element.

2. A wiper blade comprising a channel back, a soft rubber strip containing a low percentage of filler and having one edge secured in the channel of the back, and a soft rubber strip containing a high percentage of filler securely vulcanized to the other edge of the rubber strip containing the low percentage of filler to act as the wiping edge of the blade.

3. A wiper comprising a holder having a longitudinal channel formed therein, and a strip secured within the channel to form a wiping element, that portion of the strip adjacent the holder containing a low percentage of filler to afford elasticity and that portion of the strip forming the wiping edge containing a high percentage of filler to afford a low coefficient of friction of the wiping edge.

SIDNEY P. VAUGHN.